(12) United States Patent
Chen et al.

(10) Patent No.: US 8,350,539 B2
(45) Date of Patent: Jan. 8, 2013

(54) FREQUENCY MODULATION CONTROL OF A BUCK-BOOST POWER CONVERTER

(75) Inventors: Wen-Wei Chen, Luzhou (TW); Kuo-Chi Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 347 days.

(21) Appl. No.: 12/849,173

(22) Filed: Aug. 3, 2010

(65) Prior Publication Data
US 2011/0031951 A1 Feb. 10, 2011

(30) Foreign Application Priority Data

Aug. 10, 2009 (TW) .............................. 98126833 A

(51) Int. Cl.
*G05F 1/613* (2006.01)
(52) U.S. Cl. ..................... 323/224; 323/283; 323/288
(58) Field of Classification Search .................. 323/224, 323/288, 284, 283
See application file for complete search history.

(56) References Cited

U.S. PATENT DOCUMENTS
5,548,206 A * 8/1996 Soo ............................... 323/284

\* cited by examiner

*Primary Examiner* — Shawn Riley
(74) *Attorney, Agent, or Firm* — Rosenberg, Klein & Lee

(57) ABSTRACT

A control circuit and method are proposed to generate a control signal to operate a buck-boost power stage of a buck-boost power converter to convert an input voltage to an output voltage. The control circuit and method detect the output voltage to generate an error signal, control the frequency of two ramp signals according to the error signal, generate two pulse width modulation signals according to the error signal and the two ramp signals, and generate the control signal according to the two pulse width modulation signals. When the loading of the buck-boost power converter transits from heavy to light, the frequency of the two ramp signals is decreased to improve the efficiency of the buck-boost power converter. The peaks and valleys of the two ramp signals may be adjusted by signals related to the input voltage and the output voltage.

20 Claims, 10 Drawing Sheets

US 8,350,539 B2

FREQUENCY MODULATION CONTROL OF A BUCK-BOOST POWER CONVERTER

FIELD OF THE INVENTION

The present invention is related generally to a buck-boost power converter and, more particularly, to a control circuit and method for a buck-boost power converter.

BACKGROUND OF THE INVENTION

A buck power converter is circuitry to operate a buck power stage 10 as shown in FIG. 1 to step down an input voltage Vin to an output voltage Vo for a load Rload, and a boost power converter is circuitry to operate a boost power stage 12 as shown in FIG. 2 to step up an input voltage Vin to an output voltage Vo for a load Rload. Unfortunately, a conventional buck power converter or boost power converter is inadequate to provide a stable voltage for a system, for example a portable device, that uses a battery as its power source Vin because a battery is unable to provide a stable voltage all the time during its lifetime.

Since the voltage of a battery descends with exhaustion of its power, a system using a battery as its power source requires a power converter switchable between a buck mode and a boost mode. A buck-boost power converter is circuitry to operate a buck-boost power stage 14 as shown in FIG. 3 to step down or step up an input voltage Vin to an output voltage Vo for a load Rload. However, such a buck-boost power converter produces a negative output voltage Vo and is thus unsuitable for some applications. Therefore, a buck-boost power stage 16 as shown in FIG. 4 was proposed, by which a positive output voltage Vo is generated from an input voltage Vin. For operating the buck-boost power stage 16 shown in FIG. 4, there have been proposed many control circuits and methods, for example, U.S. Pat. Nos. 6,166,527 and 7,518,346. Nevertheless, these arts are still not sufficient for users' demands.

Therefore, it is desired a novel control circuit and method for a buck-boost power converter.

BRIEF SUMMARY OF THE INVENTION

An object of the present invention is to provide a control circuit and method for a buck-boost power converter.

According to the present invention, a control circuit for a buck-boost power converter includes a feedback circuit to detect the output voltage of the buck-boost power converter to generate a feedback signal, an error amplifier to amplify the difference between the feedback signal and a reference voltage to generate an error signal, a waveform generator to provide two ramp signals, a frequency controller to generate an oscillation signal according to the error signal, a clock generator to generate a clock signal according to the oscillation signal for the waveform generator to control the frequencies of the two ramp signals, a PWM comparator to generate two PWM signals according to the error signal and the two ramp signals, a gate driver to generate a control signal according to the two PWM signals to operate a buck-boost power stage to convert an input voltage to the output voltage.

According to the present invention, a control method for a buck-boost power converter detects the output voltage of the buck-boost power converter to generate a feedback signal, amplifies the difference between the feedback signal and a reference voltage to generate an error signal, generates an oscillation signal according to the error signal, generates two ramp signals according to the oscillation signal, generates two PWM signals according to the error signal and the two ramp signals, and generates a control signal according to the two PWM signals to operate a buck-boost power stage to convert an input voltage to the output voltage.

The error signal is used to control the frequencies of the two ramp signals in such a way that the frequencies are decreased for light loading to reduce the switching loss of the buck-boost power stage and thereby improve the efficiency of the buck-boost power converter.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
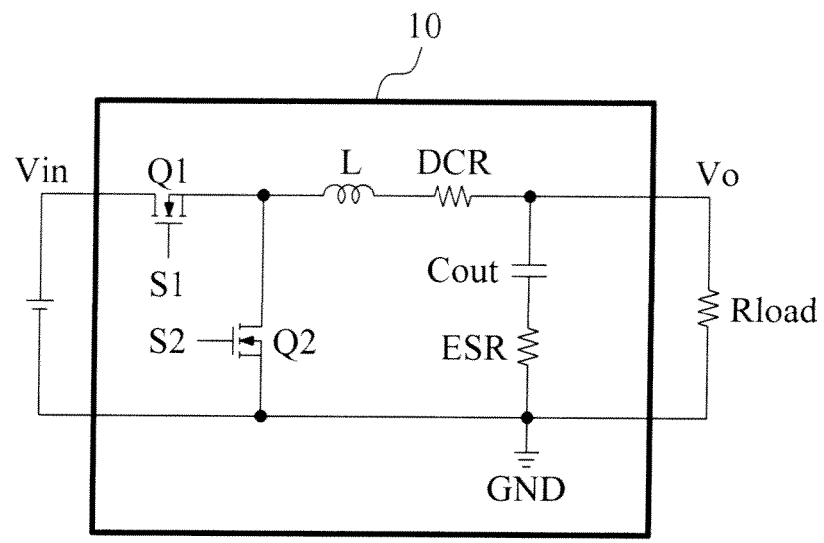
FIG. 1 is a circuit diagram of a conventional buck power stage.
Figure 2:
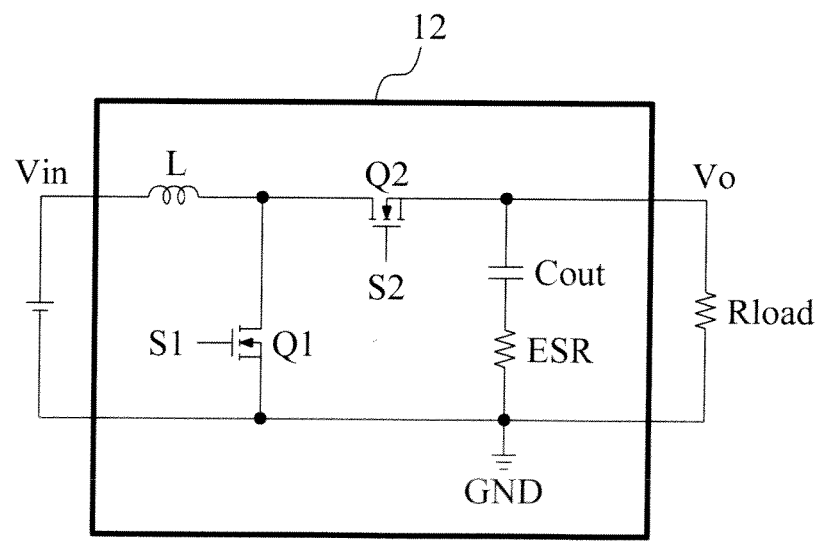
FIG. 2 is a circuit diagram of a conventional boost power stage.
Figure 3:
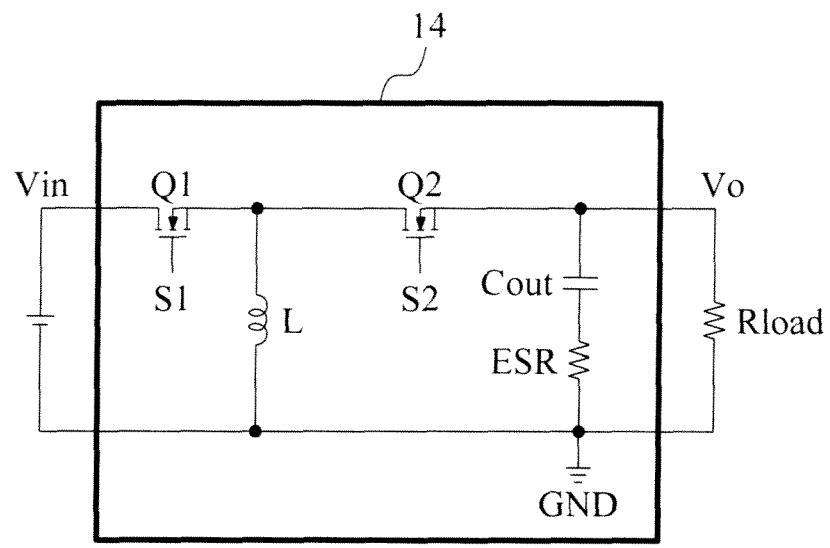
FIG. 3 is a circuit diagram of a conventional buck-boost power stage.
Figure 4:
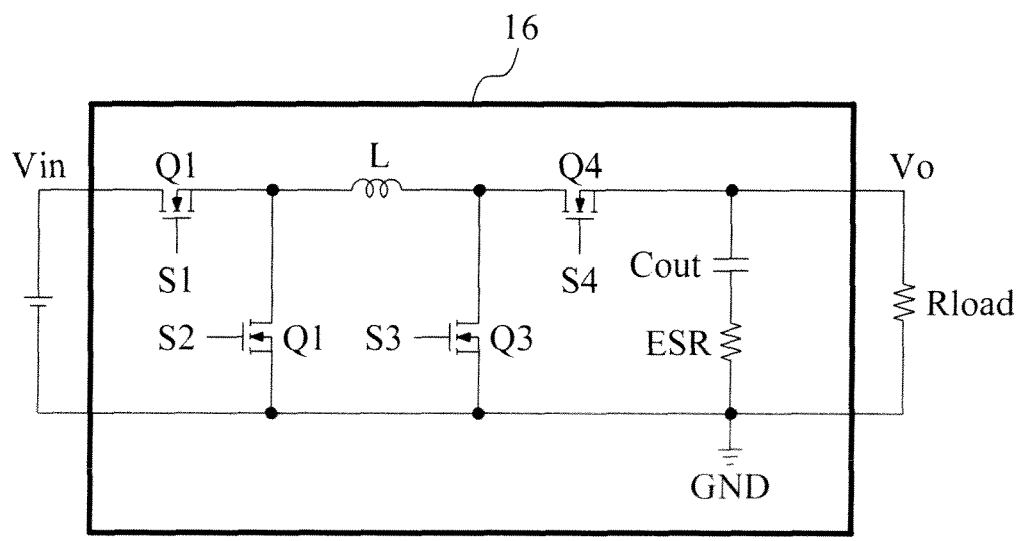
FIG. 4 is a circuit diagram of another conventional buck-boost power stage.
Figure 5:
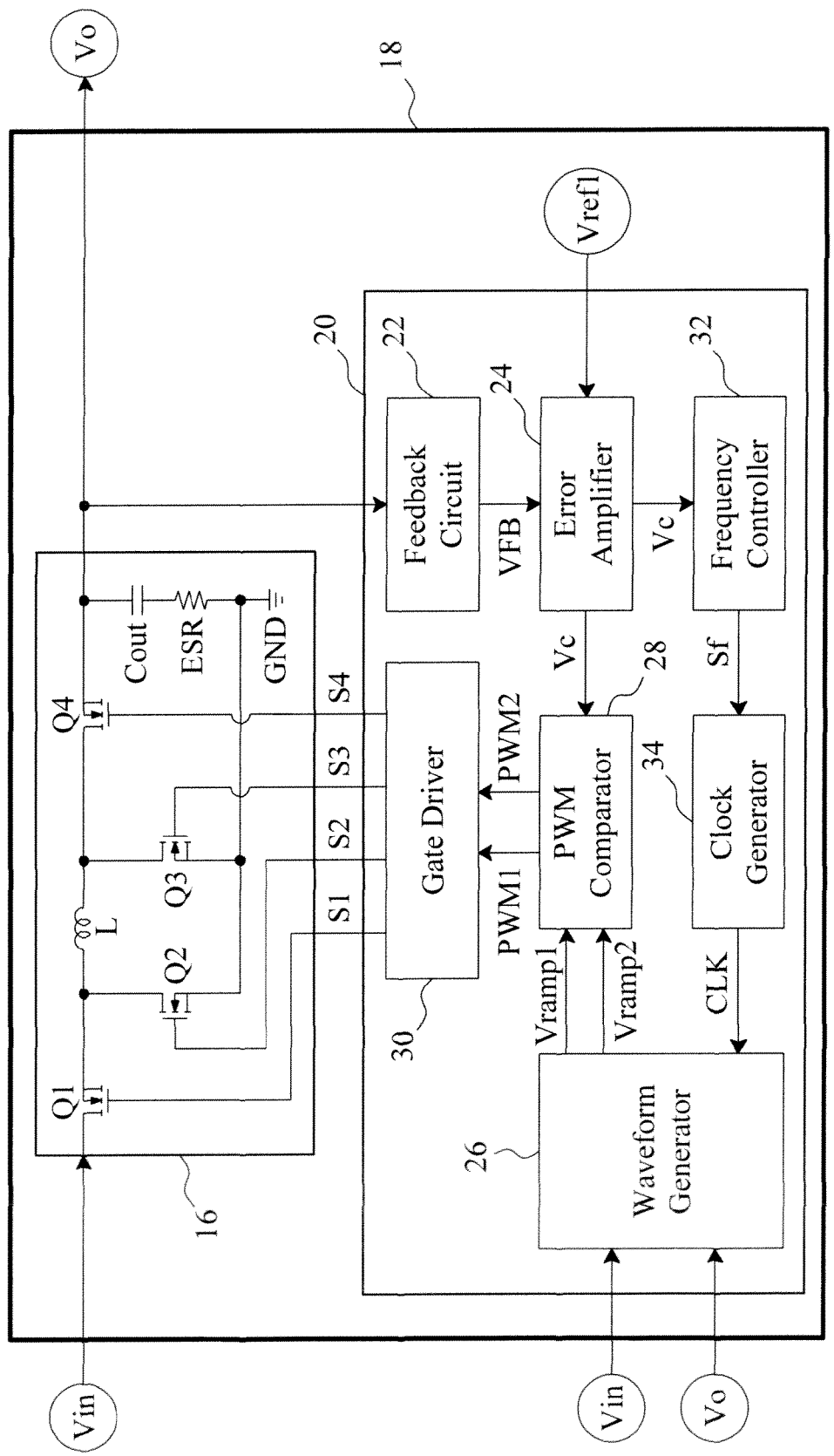
FIG. 5 is a circuit diagram of an embodiment according to the present invention.

FIG. 5 is a circuit diagram of an embodiment according to the present invention, in which a buck-boost power converter 18 includes a control circuit 20 to provide control signals S1, S2, S3 and S4 to drive power switches Q1, Q2, Q3 and Q4 of a buck-boost power stage 16, respectively, to step down or step up an input voltage Vin to an output voltage Vo. In the control circuit 20, a feedback circuit 22 detects the output voltage Vo to generate a feedback signal VFB related to the output voltage Vo, an error amplifier 24 amplifies the difference between the feedback signal VFB and a reference voltage Vref1 to generate an error signal Vc, a waveform generator 26 provides ramp signals Vramp1 and Vramp2, a PWM comparator 28 generates PWM signals PWM1 and PWM2 according to the error signal Vc and the ramp signals Vramp1 and Vramp2, a gate driver 30 generates the control signals S1, S2, S3 and S4 according to the PWM signals PWM1 and PWM2, a frequency controller 32 generates an oscillation signal Sf according to the error signal Vc, and a clock generator 34 generates a clock CLK according to the oscillation signal Sf for the waveform generator 26 to determine the frequencies of the ramp signals Vramp1 and Vramp2. The frequency of the oscillation signal Sf is determined by the error signal Vc, and the frequency of the clock CLK varies with the frequency of the oscillation signal Sf, so that the frequencies of the ramp signals Vramp1 and Vramp2 are determined by the error signal Vc.

Figure 6:
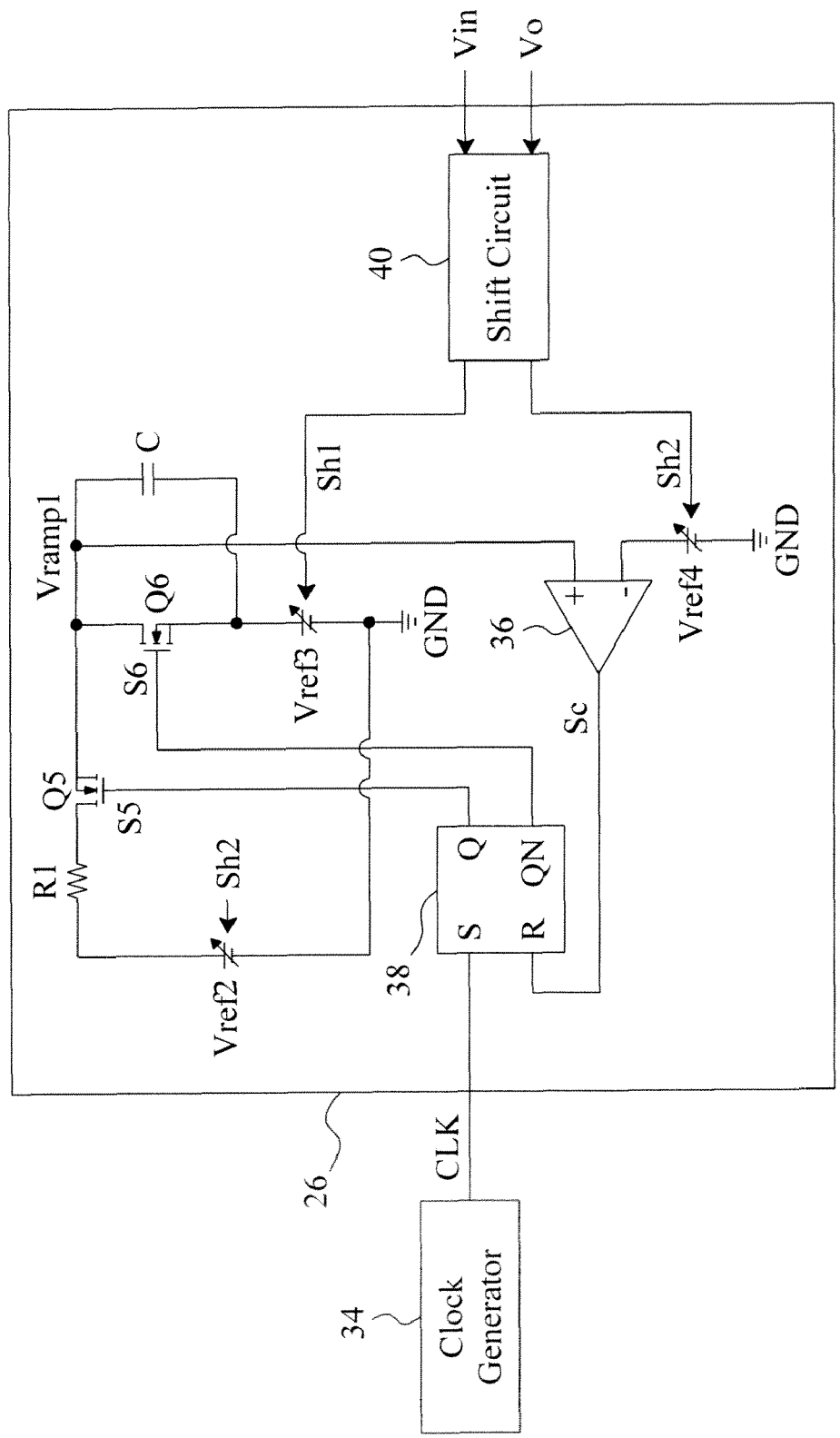
FIG. 6 is a circuit diagram of a first embodiment for the waveform generator shown in FIG. 5.

The waveform generator 26 is established by voltage sources, resistors and capacitors, and by use of the input voltage Vin and the output voltage Vo, or other signals related to the input voltage Vin and the output voltage Vo instead, controls the peaks and valleys of the ramp signals Vramp1 and Vramp2. FIG. 6 is a circuit diagram of a first embodiment for the waveform generator 26, in which a resistor R1 and a switch Q5 are connected in series between a variable voltage source Vref2 and a capacitor C, a switch Q6 is connected in parallel with the capacitor C, signals S5 and S6 control the switches Q5 and Q6, respectively, to charge and discharge the capacitor C to generate the ramp signal Vramp1, a variable voltage source Vref3 is connected between the capacitor C and a ground GND, a comparator 36 compares the ramp signal Vramp1 with a voltage Vref4 to generate a comparison signal Sc, an SR flip-flop 38 generates the signals S5 and S6 according to the clock CLK and the comparison signal S5, a shift circuit 40 level shifts the voltages Vref2, Vref3 and Vref4 according to the input voltage Vin and the output voltage Vo to adjust the peak and the valley of the ramp signal Vramp1. The SR flip-flop 38 may be substituted by a D-type flip-flop or other logic circuits for the same purpose. When the input voltage Vin is close to the output voltage Vo, the shift circuit 40 pulls high the voltages Vref2 and Vref4 or pulls low the voltage Vref3 to increase the peak of the ramp signal Vramp1 or to decrease the valley of the ramp signal Vramp1, thereby enabling the ramp signal Vramp1 to determine, together with the error signal Vc, a proper duty for the PWM signal PWM1 to improve the stability of the buck-boost power converter 18. Alternatively, the shift circuit 40 may increase or decrease the peak and the valley of the ramp signal Vramp1 simultaneously to shift the ramp signal Vramp1 upward or downward, to improve the stability of the buck-boost power converter 18.

Figure 7:
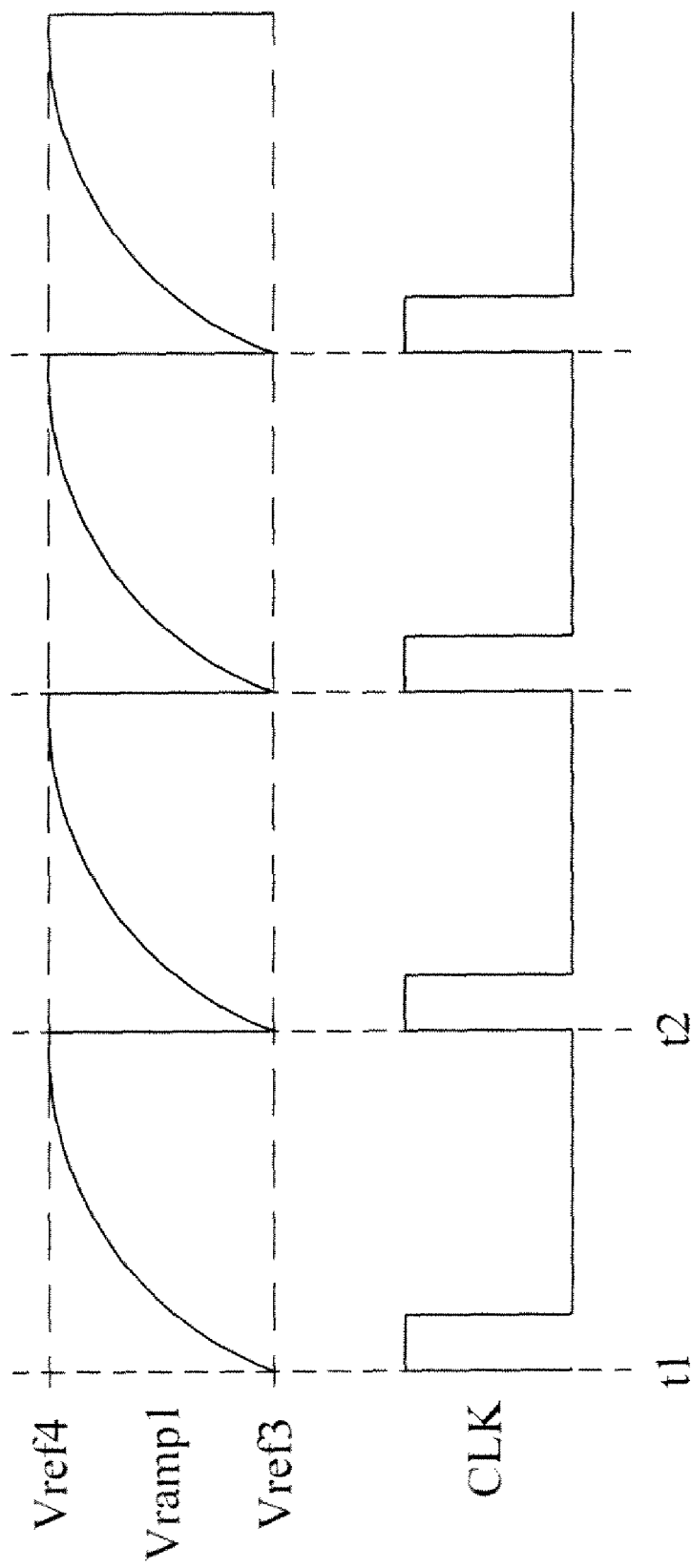
FIG. 7 is a waveform diagram of the waveform generator shown in FIG. 6 when using a constant frequency clock.

If the clock CLK has a constant frequency, the ramp signal Vramp1 has a waveform as shown in FIG. 7. At time t1, the clock CLK triggers the output S5 of the SR flip-flop 38 and thereby turns on the switch Q5, to charge the capacitor C by the voltage source Vref2, and as a result the ramp signal Vramp1 begins increasing. When the ramp signal Vramp1 increases to greater than the voltage Vref4, as shown at time t2, the output Sc of the comparator 36 resets the SR flip-flop 38 and thereby turns off the switch Q5 and turns on the switch Q6, causing the capacitor C to discharge to the level of the voltage Vref3. In this embodiment, since the frequency of the clock CLK is fixed, the ramp signal Vramp1 has a constant frequency.

Figure 8:
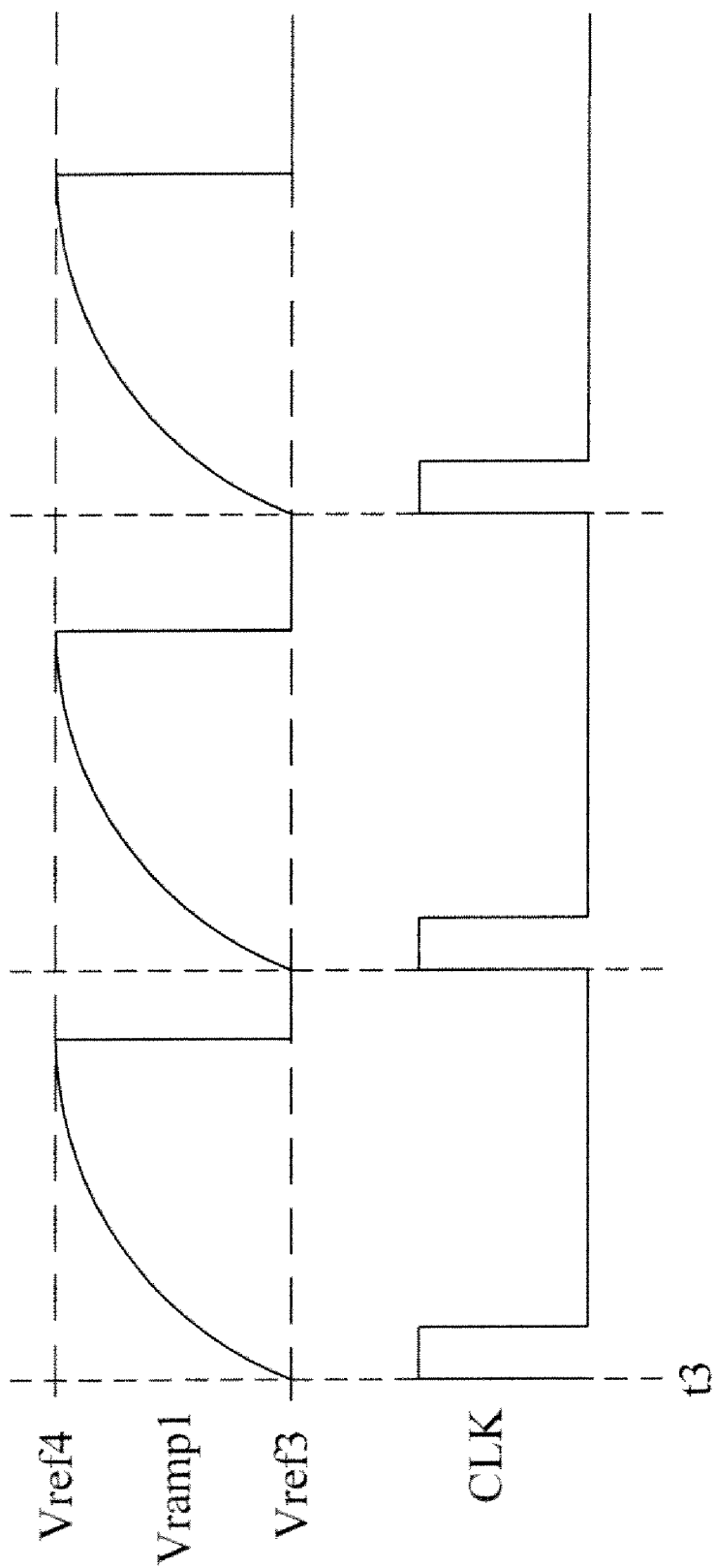
FIG. 8 is a waveform diagram of the waveform generator shown in FIG. 6 when using a variable frequency clock.

If the clock CLK has a variable frequency, the ramp signal Vramp1 has a waveform as shown in FIG. 8. At time t3, the clock CLK triggers the SR flip-flop 38 and thereby turns on the switch Q5, to charge the capacitor C by the voltage source Vref2. When the ramp signal Vramp1 increases to greater than the voltage Vref4, the comparator 36 resets the SR flip-flop 38 and thereby turns off the switch Q5 and turns on the switch Q6, causing the capacitor C to discharge to the level of the voltage Vref3. In this embodiment, since the frequency of the clock CLK is variable, the ramp signal Vramp1 has a variable frequency.

Figure 9:
FIG. 9 is a waveform diagram of a non-linear ramp signal.
Figure 10:
FIG. 10 is a waveform diagram of a non-linear ramp signal.
Figure 11:
FIG. 11 is a waveform diagram of a non-linear ramp signal.
Figure 12:
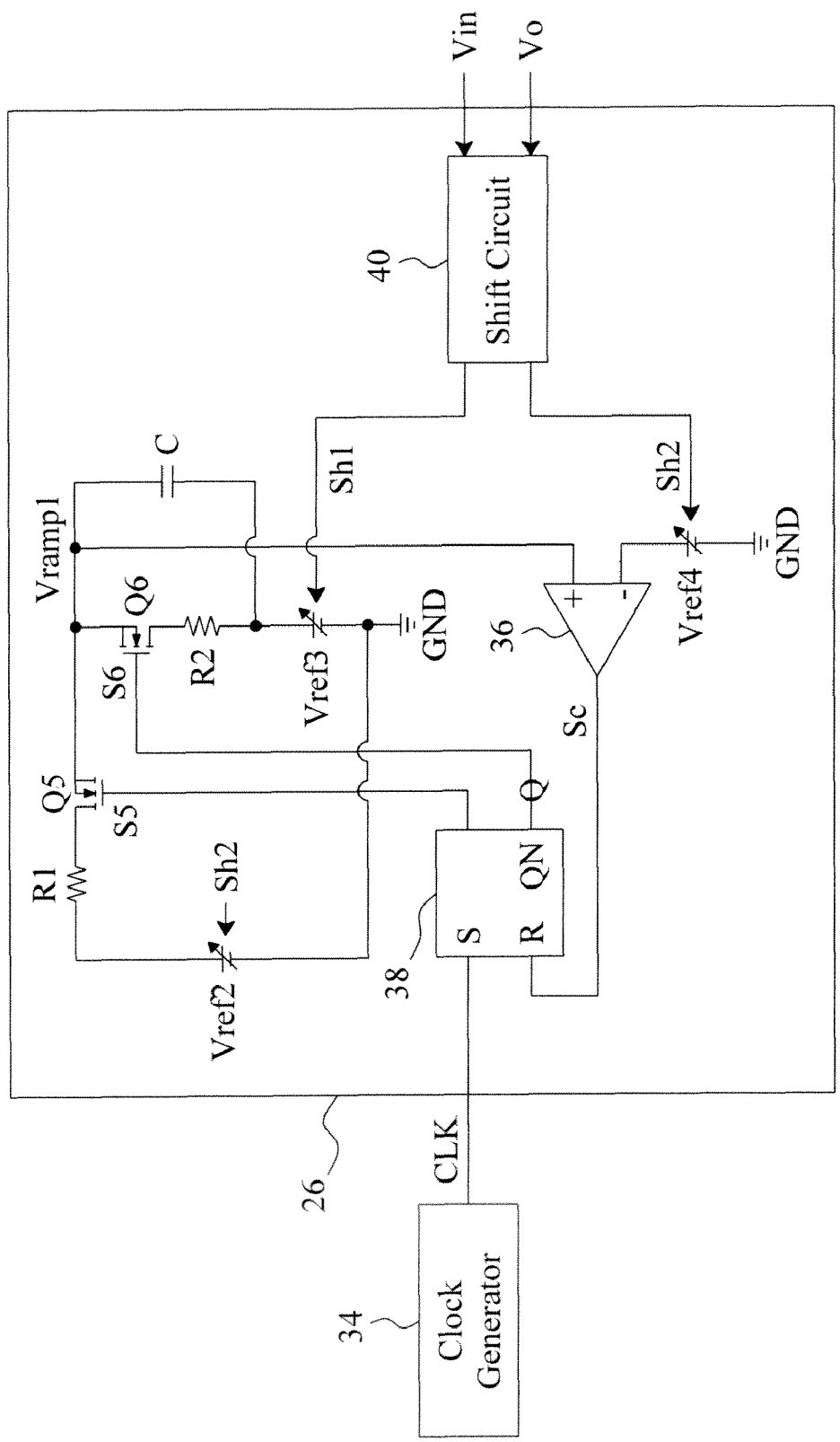
FIG. 12 is a circuit diagram of a second embodiment for the waveform generator shown in FIG. 5.

As shown in FIGS. 7 and 8, the waveform generator 26 provides a non-linear ramp signal Vramp1, which enables the buck-boost power converter 18 with better voltage regulation and transient response for heavy loading, as compared with a linear ramp signal. In addition to the waveforms shown in FIGS. 7 and 8, the waveform generator 26 may provide a non-linear ramp signal Vramp1 with other waveforms, for example, shown in FIG. 9, 10 or 11, by using different circuits and methods. FIG. 12 is a circuit diagram of a second embodiment for the waveform generator 26 to provide the ramp signal Vramp1 shown in FIG. 10, in which a resistor R2 is additionally connected in series with the switch Q6 as compared with the waveform generator 26 of FIG. 6. Due to the resistor R2, the ramp signal Vramp1 decreases to the level of the voltage Vref3 mildly when the capacitor C discharges, as shown in FIG. 10.

The circuit for generating the ramp signal Vramp2 is similar to that for generating the ramp signal Vramp1 and needs not to be discussed repeatedly. As did the ramp signal Vramp1, the ramp signal Vramp2 may have its frequency fixed or variable, and may have a non-linear waveform.

Figure 13:
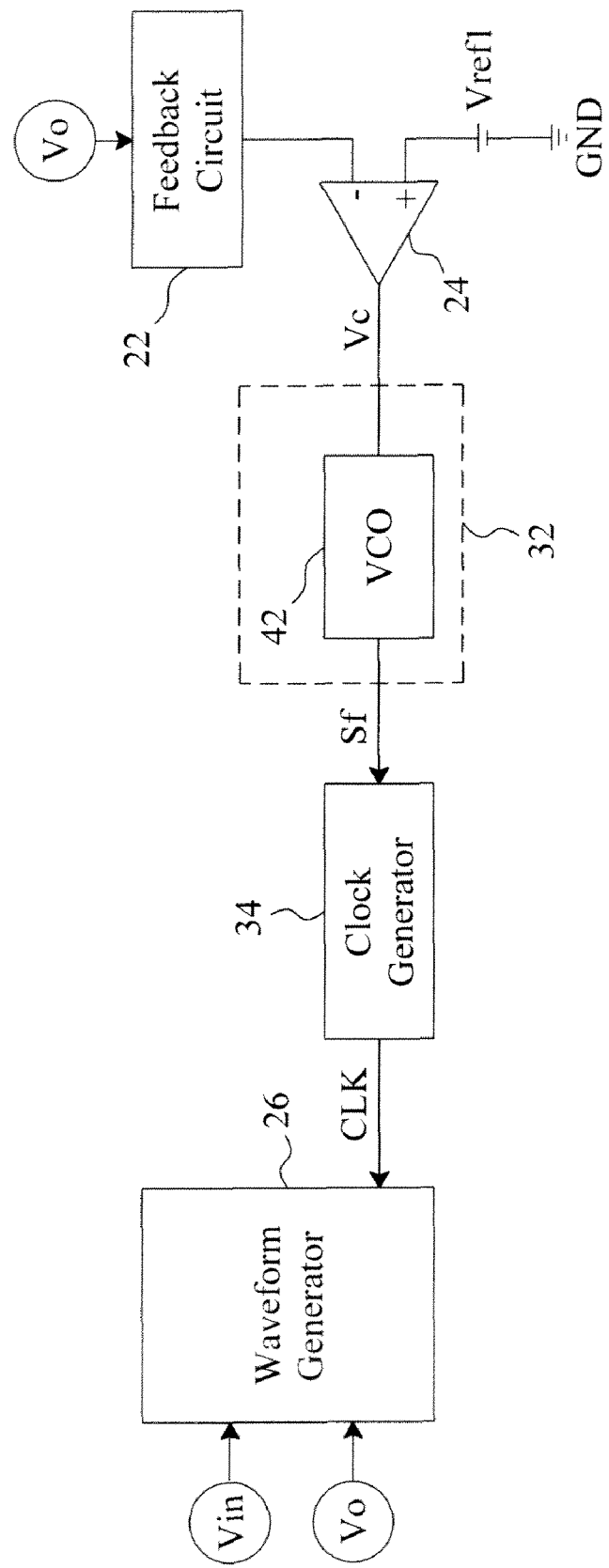
FIG. 13 is a circuit diagram of a first embodiment for the frequency controller shown in FIG. 5.

FIG. 13 is a circuit diagram of a first embodiment for the frequency controller 32, which includes a voltage-controlled oscillator (VCO) 42 to generate the oscillation signal Sf according to the error signal Vc, with the frequency thereof increasing or decreasing with raising or failing of the error signal Vc. At heavy load, the error signal Vc is greater and therefore the VCO 42 provides an oscillation signal Sf with a higher frequency. On the contrary, at light load the error signal Vc is smaller and therefore the VCO 42 provides an oscillation signal Sf with a lower frequency. Since the ramp signal Vramp1 and Vramp2 have lower frequencies at light load, the frequencies of the PWM signals PWM1 and PWM2 are consequently low, thereby reducing the switching loss of the buck-boost power stage 16 and in turn improving the efficiency of the buck-boost power converter 18.

Figure 14:
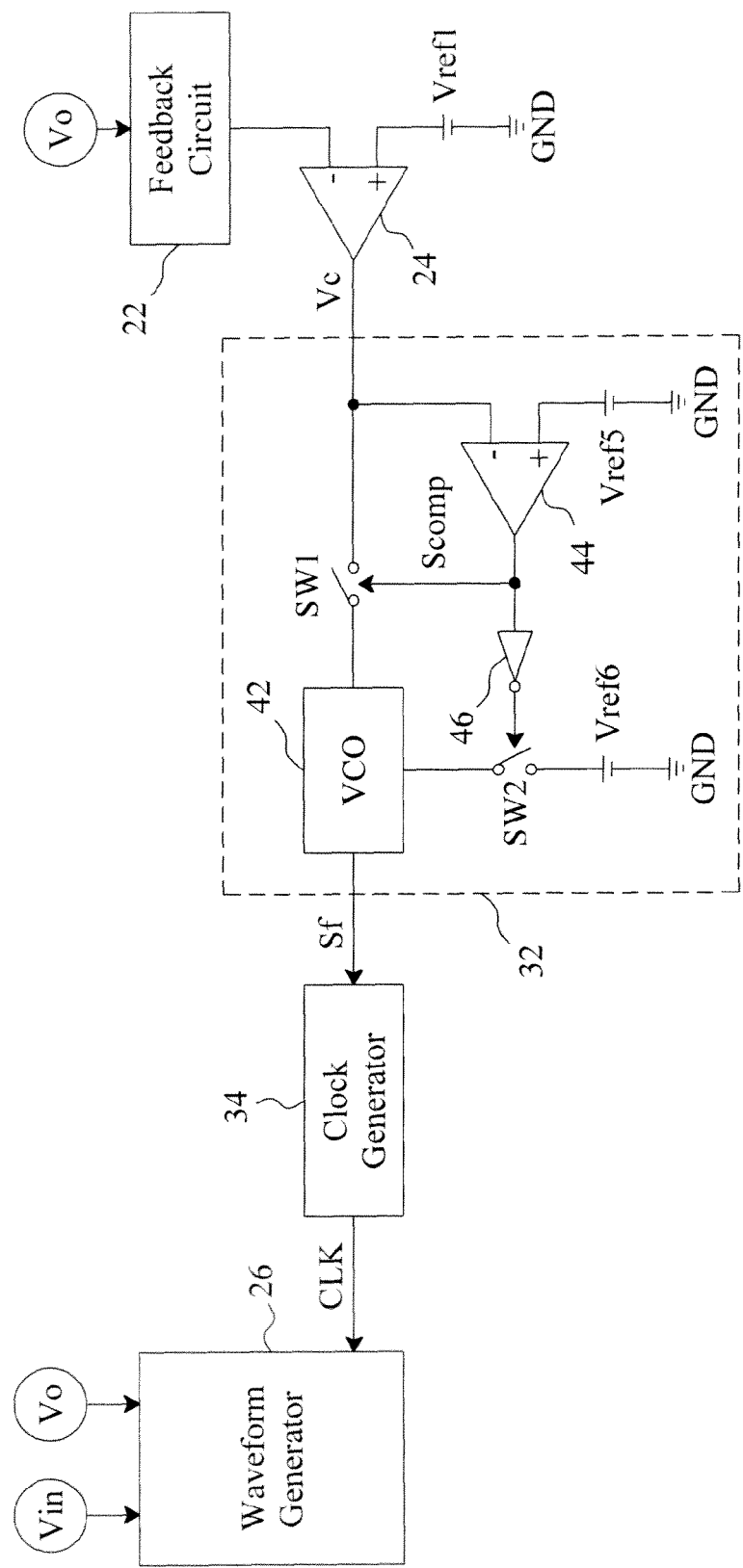
FIG. 14 is a circuit diagram of a second embodiment for the frequency controller shown in FIG. 5.

FIG. 14 is a circuit diagram of a second embodiment for the frequency controller 32. In addition to the VCO 42, this frequency controller 32 further includes a switch SW1 connected between the VCO 42 and the error amplifier 24, and a comparator 44 to compare the error signal Vc with the voltage Vref5 to generate a comparison signal Scomp to switch the switch SW1 and a switch SW2 connected between the VCO 42 and a constant voltage source Vref6 by an inverter 46. At heavy load, the error signal Vc is higher than the voltage Vref5, so the switch SW1 is off while the switch SW2 is on. In this case, the VCO 42 generates an oscillation signal Sf with a constant frequency according to the constant voltage Vref6. When transiting to light loading, the error signal Vc decreases, and once the error signal Vc becomes smaller than the voltage Vref5, the comparator 44 turns on the switch SW1 and turns off the switch SW2, so that the VCO 42 generates an oscillation signal Sf with a variable frequency according to the error signal Vc.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for generating a control signal to operate a buck-boost power stage of a buck-boost power converter to convert an input voltage to an output voltage, the control circuit comprising:

a feedback circuit operative to detect the output voltage to generate a feedback signal as a function of the output voltage;

an error amplifier connected to the feedback circuit for amplifying a difference between the feedback signal and a reference voltage to generate an error signal;

a waveform generator operative to provide a first ramp signal and a second ramp signal;

a frequency controller connected to the error amplifier, operative to generate an oscillation signal according to the error signal;

a clock generator connected to the frequency controller and the waveform generator for generating a clock signal according to the oscillation signal for the waveform generator to control frequencies of the first and second ramp signals;

a PWM comparator connected to the error amplifier and the waveform generator for generating a first PWM signal and a second PWM signal according to the error signal and the first and second ramp signals; and a gate driver connected to the PWM comparator and the buck-boost power stage for generating the control signal according to the first and second PWM signals.

2. The control circuit of claim 1, wherein each of the first and second ramp signals has a non-linear waveform.

3. The control circuit of claim 1, wherein the waveform generator adjusts peaks and valleys of the first and second ramp signals according to signals related to the input voltage and the output voltage.

4. The control circuit of claim 1, wherein the waveform generator comprises:
a first variable voltage source for providing a first variable voltage;
a second variable voltage source for providing a second variable voltage;
a capacitor connected between the first and second variable voltage sources;
a resistor and a first switch connected in series between the first variable voltage source and the capacitor, the first switch being turned on by a first signal to charge the capacitor by the first variable voltage source;
a second switch connected in parallel with the capacitor and being turned on by a second signal to discharge the capacitor;
a third variable voltage source for providing a third variable voltage;
a comparator connected to the capacitor and the third variable voltage source for comparing the first ramp signal with the third variable voltage to generate a comparison signal;
a flip-flop connected to the comparator and the clock generator, operative to generate the first and second signals according to the clock signal and the comparison signal; and
a shift circuit connected to the first, second and third variable voltage sources, operative to level shift the first, second and third variable voltages according to the input and output voltages to control a peak and a valley of the first ramp signal.

5. The control circuit of claim 4, further comprising a second resistor connected in series with the second switch for controlling a discharge speed of the capacitor.

6. The control circuit of claim 1, wherein the waveform generator comprises:
a first variable voltage source for providing a first variable voltage;
a second variable voltage source for providing a second variable voltage;
a capacitor connected between the first and second variable voltage sources;
a resistor and a first switch connected in series between the first variable voltage source and the capacitor, the first switch being turned on by a first signal to charge the capacitor by the first variable voltage source;
a second switch connected in parallel with the capacitor and being turned on by a second signal to discharge the capacitor;
a third variable voltage source for providing a third variable voltage;
a comparator connected to the capacitor and the third variable voltage source for comparing the second ramp signal with the third variable voltage to generate a comparison signal;
a flip-flop connected to the comparator and the clock generator, operative to generate the first and second signals according to the clock signal and the comparison signal; and
a shift circuit connected to the first, second and third variable voltage sources, operative to level shift the first, second and third variable voltages according to the input and output voltages to control a peak and a valley of the second ramp signal.

7. The control circuit of claim 6, further comprising a second resistor connected in series with the second switch for controlling a discharge speed of the capacitor.

8. The control circuit of claim 1, wherein the frequency controller comprises a voltage-controlled oscillator connected to the error amplifier and the clock generator for generating the oscillation signal according to the error signal for the clock generator, with a frequency thereof increasing or decreasing with increasing or decreasing of the error signal.

9. The control circuit of claim 1, wherein the frequency controller comprises:
a voltage-controlled oscillator connected to the clock generator for generating the oscillation signal for the clock generator;
a first switch connected between the error amplifier and the voltage-controlled oscillator;
a first constant voltage source for providing a first constant voltage;
a comparator connected to the error amplifier and the first constant voltage source for comparing the error signal with the first constant voltage to generate a comparison signal to turn on the first switch when the error signal is smaller than the first constant voltage, for the voltage-controlled oscillator to generate the oscillation signal according to the error signal;
a second constant voltage source for providing a second constant voltage;
a second switch connected between the second constant voltage source and the voltage-controlled oscillator; and
an inverter connected between the comparator and the second switch for inverting the comparison signal to turn on the second switch when the error signal is greater than the first constant voltage, for the voltage-controlled oscillator to generate the oscillation signal according to the second constant voltage.

10. The control circuit of claim 9, wherein the oscillation signal has a frequency varying with the error signal when the error signal is smaller than the first constant voltage.

11. The control circuit of claim 9, wherein the oscillation signal has a constant frequency when the error signal is greater than the first constant voltage.

12. A control method for generating a control signal to operate a buck-boost power stage of a buck-boost power converter to convert an input voltage to an output voltage, the control method comprising the steps of:
(A) detecting the output voltage to generate a feedback signal as a function of the output voltage;

(B) amplifying a difference between the feedback signal and a reference voltage to generate an error signal;

(C) generating an oscillation signal according to the error signal;

(D) generating a first ramp signal and a second ramp signal according to the oscillation signal;

(E) generating a first PWM signal and a second PWM signal according to the error signal and the first and second ramp signals; and (F) generating the control signal according to the first and second PWM signals.

13. The control method of claim 12, wherein the step (C) comprises the step of increasing or decreasing a frequency of the oscillation signal with increasing or decreasing of the error signal.

14. The control method of claim 12, wherein the step (C) comprises the steps of:
increasing or decreasing a frequency of the oscillation signal with increasing or decreasing of the error signal when the error signal is smaller than a first voltage; and
keeping the frequency of the oscillation signal constant when the error signal is greater than the first voltage.

15. The control method of claim 12, wherein the step (D) comprises the step of controlling each of the first and second ramp signals to have a non-linear waveform.

16. The control method of claim 12, wherein the step (D) comprises the steps of:
generating a clock signal responsive to the oscillation signal;
triggering a first signal responsive to the clock signal;
charging a capacitor responsive to the first signal;
extracting the first ramp signal from the capacitor;
comparing the first ramp signal with a variable voltage to trigger a second signal;
discharging the capacitor responsive to the second signal; and
controlling a peak and a valley of the first ramp signal according the input and output voltages.

17. The control method of claim 16, further comprising the step of controlling a discharge speed of the capacitor.

18. The control method of claim 12, wherein the step (D) comprises the steps of:
generating a clock signal responsive to the oscillation signal;
triggering a first signal responsive to the clock signal;
charging a capacitor responsive to the first signal;
extracting the second ramp signal from the capacitor;
comparing the second ramp signal with a variable voltage to trigger a second signal;
discharging the capacitor responsive to the second signal; and
controlling a peak and a valley of the second ramp signal according to the input and output voltages.

19. The control method of claim 18, further comprising the step of controlling a discharge speed of the capacitor.

20. The control method of claim 12, further comprising the step of adjusting peaks and valleys of the first and second ramp signals according to signals related to the input voltage and the output voltage.

* * * * *